(12) United States Patent
Hashimoto et al.

(10) Patent No.: US 11,059,117 B2
(45) Date of Patent: Jul. 13, 2021

(54) SOLDERING METHOD AND SOLDERING APPARATUS

(71) Applicants: SENJU METAL INDUSTRY CO., LTD., Tokyo (JP); Senju System Technology Co., Ltd., Toyama (JP)

(72) Inventors: Noboru Hashimoto, Toyama (JP); Takahiro Kasama, Toyama (JP)

(73) Assignees: SENJU METAL INDUSTRY CO., LTD., Tokyo (JP); SENJU SYSTEM TECHNOLOGY CO., LTD., Toyama (JP)

( * ) Notice: Subject to any disclaimer, the term of this patent is extended or adjusted under 35 U.S.C. 154(b) by 0 days.

(21) Appl. No.: 16/696,907

(22) Filed: Nov. 26, 2019

(65) Prior Publication Data

US 2020/0254549 A1   Aug. 13, 2020

(30) Foreign Application Priority Data

Feb. 12, 2019   (JP) .............................. JP2019-022608

(51) Int. Cl.
*B23K 1/00* (2006.01)
*B23K 1/08* (2006.01)

(52) U.S. Cl.
CPC ..................................... *B23K 1/08* (2013.01)

(58) Field of Classification Search
CPC .... B23K 1/008; B23K 3/0669; B23K 1/0016; B23K 1/002; B23K 1/0053; B23K 1/012; B23K 1/018; B23K 1/08; B23K 2101/006; B23K 2103/10; B23K 35/224; B23K 35/3612; B23K 3/04; B23K 3/08; B23K 3/082; B23K 3/087; B23K 9/167
See application file for complete search history.

(56) References Cited

U.S. PATENT DOCUMENTS

| | | | | | |
|---|---|---|---|---|---|
| 2,964,007 | A | * | 12/1960 | Buffington | B23K 3/0669 228/12 |
| 3,056,371 | A | * | 10/1962 | Frank | B23K 3/0669 228/40 |
| 4,351,266 | A | * | 9/1982 | Ando | C25D 17/06 118/425 |
| 4,609,563 | A | * | 9/1986 | Shimrock | B01J 37/0215 427/8 |

(Continued)

FOREIGN PATENT DOCUMENTS

| | | | | |
|---|---|---|---|---|
| DE | 102011106762 A1 | * | 1/2013 | .......... H05K 3/3468 |
| JP | 2000-133922 A | | 5/2000 | |

(Continued)

OTHER PUBLICATIONS

DE-102011106762-A1 computer english translation (Year: 2020).*

*Primary Examiner* — Erin B Saad
(74) *Attorney, Agent, or Firm* — Harness, Dickey & Pierce, P.L.C.

(57) ABSTRACT

To provide a soldering method and a soldering apparatus which are capable of preheating a mask without degrading throughput.
Provided is a soldering method including preheating a mask on which a substrate is not placed, placing the substrate on the preheated mask, and bringing at least a part of the substrate placed on the preheated mask into contact with molten solder and thus soldering the substrate.

7 Claims, 4 Drawing Sheets

(56) References Cited

U.S. PATENT DOCUMENTS

| | | | | |
|---|---|---|---|---|
| 4,766,844 | A | * | 8/1988 | Brewer .................. B23K 1/085 |
| | | | | 118/406 |
| 4,958,588 | A | * | 9/1990 | Hutchison ................. B05C 3/20 |
| | | | | 118/423 |
| 5,248,340 | A | * | 9/1993 | Nakagawa ........... H05K 13/028 |
| | | | | 118/422 |
| 5,515,605 | A | * | 5/1996 | Hartmann ............ B23K 1/0053 |
| | | | | 219/85.12 |
| 6,257,480 | B1 | * | 7/2001 | Furumoto .............. B23K 1/085 |
| | | | | 228/1.1 |
| 2003/0132213 | A1 | * | 7/2003 | Kim .................. H01L 21/67109 |
| | | | | 219/390 |
| 2004/0262278 | A1 | * | 12/2004 | Ciniglio ................... H05K 3/34 |
| | | | | 219/129 |
| 2005/0045914 | A1 | * | 3/2005 | Agranat ............ H01L 21/67144 |
| | | | | 257/200 |
| 2010/0044347 | A1 | * | 2/2010 | Prochazka ............. B23K 9/167 |
| | | | | 219/74 |
| 2018/0119285 | A1 | * | 5/2018 | Kurita .................... F27D 11/10 |

FOREIGN PATENT DOCUMENTS

| | | |
|---|---|---|
| JP | 2008-124332 A | 5/2008 |
| JP | 2008-171994 A | 7/2008 |
| JP | 2009-059920 A | 3/2009 |
| JP | 4526555 B2 | 8/2010 |

\* cited by examiner

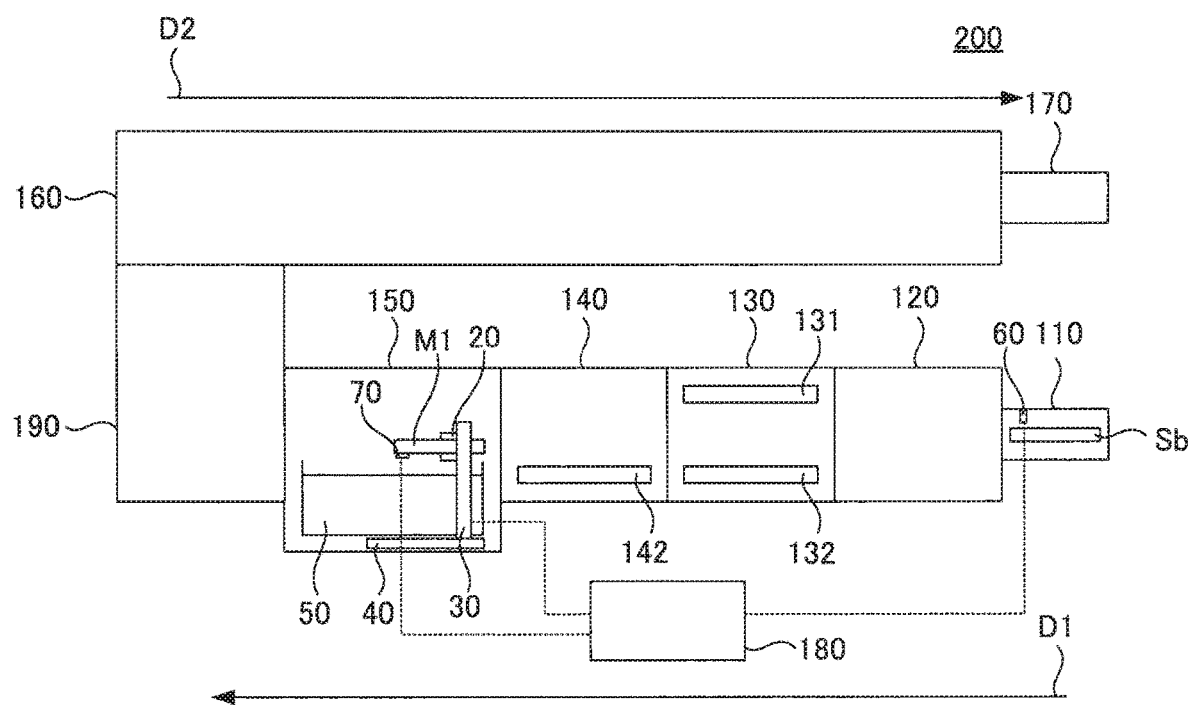

SOLDERING METHOD AND SOLDERING APPARATUS

TECHNICAL FIELD

This application is based upon and claims benefit of priority from Japanese Patent Application No. 2019-022608 filed on Feb. 12, 2019, the entire contents of which are incorporated herein by reference.

The invention relates to soldering methods and soldering apparatuses.

BACKGROUND ART

Apparatuses that immerse substrates in molten solder to solder printed wiring boards have been known. These soldering apparatuses previously heat the substrates to a predetermined temperature before immersing the substrates in the molten solder. This prevents or reduces a thermal shock caused to the substrates and the electronic components mounted on the substrates by a sudden temperature increase in the substrates when the substrates are immersed in the molten solder. Also, the preheating of the substrates activates the flux applied to the substrates.

Known as one of these soldering apparatuses is an apparatus configured to bring a part of the lower surface of a pallet into contact with molten solder with a substrate placed on the pallet and previously heat the substrate before soldering the substrate (see Patent Literature 1). This soldering apparatus eliminates the necessity of providing particular equipment for preheating the substrate, downsizing the soldering apparatus and thus reducing initial costs.

CITATION LIST

Patent Literature

PTL 1: Japanese Patent No. 4526555

SUMMARY OF INVENTION

Technical Problem

On the other hand, the invention disclosed in the Patent Literature 1 is not intended to preheat a mask (pallet). When the soldering apparatus starts soldering a substrate, the mask is located near above a solder tank containing molten solder. However, the mask is likely to be lower in temperature than a preheated substrate. Especially when the soldering apparatus starts processing the first substrate, there is a large temperature difference between the preheated substrate and the mask. If the preheated substrate is placed on the low-temperature mask, the substrate is cooled, which might deteriorate the quality of soldering.

According to the soldering apparatus disclosed in the Patent Literature 1, a part of the mask is in contact with the molten solder when the substrate is preheated, so that the mask is preheated as well as the substrate. According to the soldering apparatus of the Patent Literature 1, however, after the substrate and mask transferred to the solder tank are finished to be preheated, the substrate is immersed in the molten solder. That means that the soldering apparatus is not capable of preheating the mask and performing the soldering at the same time and therefore does not provide good throughput.

The invention has been made in light of the foregoing problem. An object of the invention is to provide a soldering method and a soldering apparatus which are capable of preheating a mask while preventing the degradation of throughput.

Solution to Problem

One embodiment of the invention provides a soldering method. The soldering method includes preheating a mask on which a substrate is not placed, placing the substrate on the preheated mask, and bringing at least a part of the substrate placed on the preheated mask into contact with molten solder and thus soldering the substrate.

Another embodiment provides a soldering apparatus. The soldering apparatus includes a preheater configured to preheat a mask on which a substrate is not placed, and a soldering section configured to solder the substrate placed on the preheated mask.

BRIEF DESCRIPTION OF DRAWINGS

FIG. 10 is a schematic lateral view of a soldering apparatus according to still another embodiment.

DESCRIPTION OF EMBODIMENTS

Figure 1:
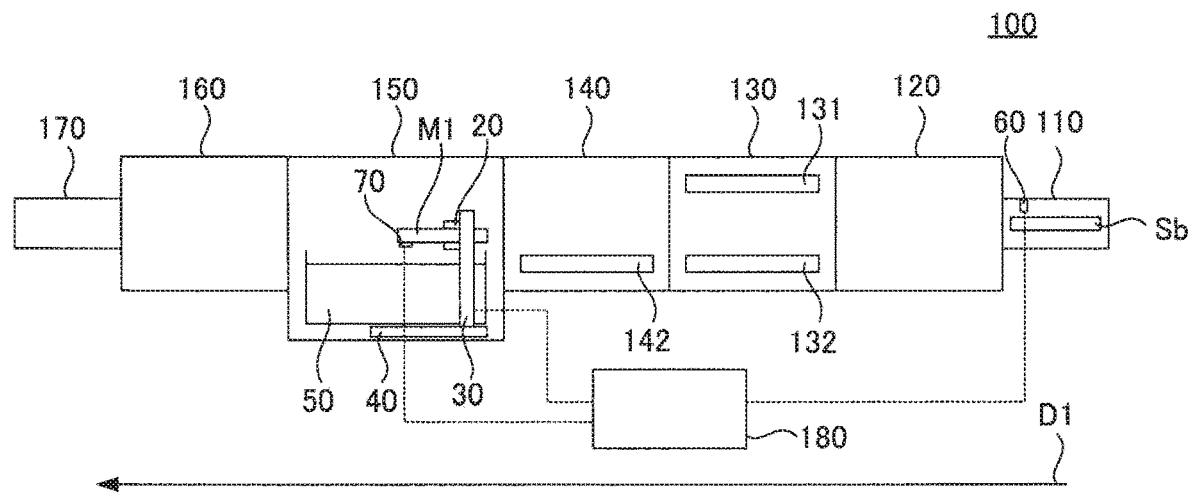
FIG. 1 is a schematic lateral view of a soldering apparatus according to one embodiment.

Embodiments of the invention will be discussed below with reference to the attached drawings. In the drawings mentioned below, the same or corresponding constituent elements are provided with the same reference marks, and overlapping descriptions are omitted. Soldering apparatuses according to the embodiments are designed to bring a substrate on which, for example, electronic components are mounted into contact with molten solder and thus solder the substrate.

Figure 2:
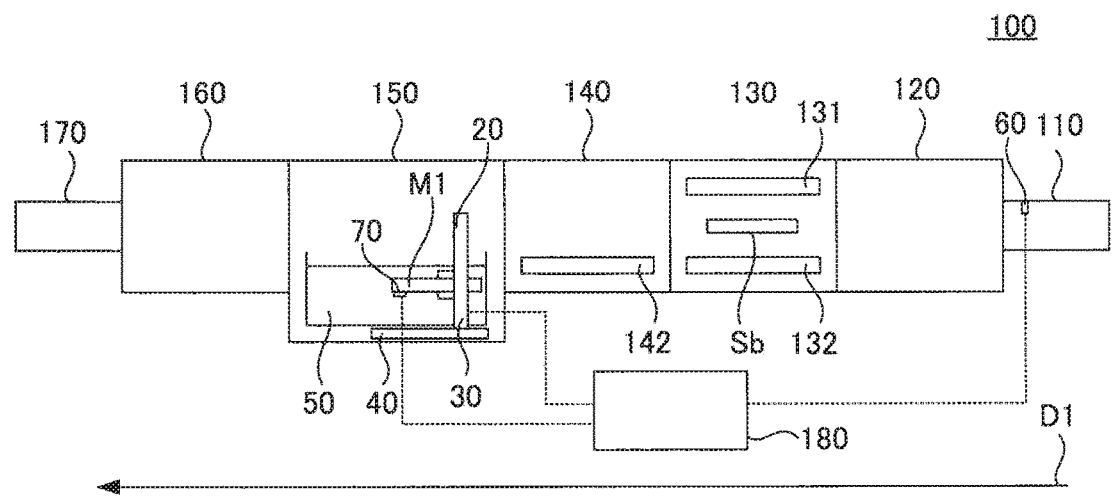
FIG. 2 is a schematic lateral view of the soldering apparatus according to the present embodiment.
Figure 3:
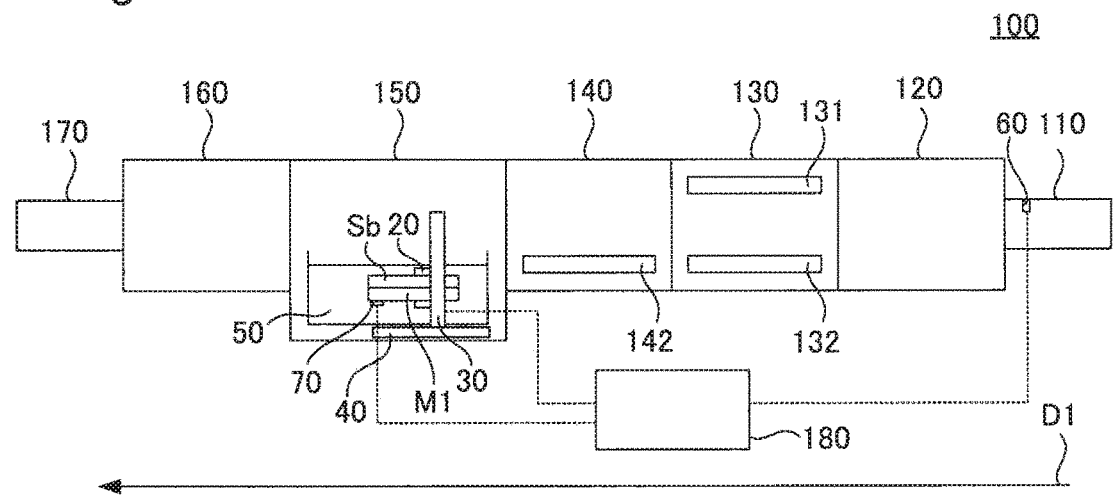
FIG. 3 is a schematic lateral view of the soldering apparatus according to the present embodiment.

FIGS. 1, 2 and 3 are schematic lateral views of the soldering apparatus according to one of the embodiments. As illustrated in FIGS. 1, 2 and 3, the soldering apparatus 100 according to the present embodiment includes a loading section 110, a fluxer 120, a first preheating section 130, a second preheating section 140, a soldering section 150, a cooling section 160, an unloading section 170, and a controller 180. According to the present embodiment, the transfer of substrates Sb is controlled, for example, so that the substrates Sb are transferred every 35 seconds between the loading section 110, the fluxer 120, the first preheating section 130, the second preheating section 140, the soldering section 150, the cooling section 160, and the unloading section 170 of the soldering apparatus 100. A direction of transferring the substrates is shown by arrow D1 in FIGS. 1, 2 and 3.

The loading section 110 has a loading opening, not shown, through which the substrate Sb is charged into the loading section 110. In the soldering apparatus 100 illustrated in FIG. 1, the substrate Sb is located in the loading section 110. The soldering apparatus 100 includes a transferring device, not shown, such as a transfer chain and a belt conveyer, for transferring the substrate charged into the loading section 110 toward the unloading section 170. The fluxer 120 is configured to apply flux to the substrate Sb. The flux may be, for example, a solvent and an activator or the like.

The first preheating section 130 includes an upper heater 131 and a lower heater 132. The first preheating section 130 is configured to heat both surfaces of the transferred substrate Sb as illustrated in FIG. 2. The second preheating section 140 includes a lower heater 142. The second preheating section 140 is configured to further heat the substrate Sb which is already heated by the first preheating section 130 to a certain degree. The upper heater 131 and the lower heaters 132 and 142 may be, for example, halogen heaters. The first preheating section 130 and the second preheating section 140 may include fans, not shown, for blowing gas heated by the upper heater 131 and the lower heaters 132 and 142 onto the substrate Sb. The substrate Sb is preheated to a predetermined temperature by the first and second preheating sections 130 and 140. This activates the flux applied by the fluxer 120. The preheating of the substrate Sb prevents or reduces a thermal shock caused when the substrate Sb contacts the molten solder in the soldering section 150 which performs the subsequent step. The soldering apparatus 100 according to the present embodiment includes the first and second preheating sections 130 and 140 functioning as a mechanism for preheating the substrate Sb. Instead of including the first and second preheating sections 130 and 140, however, the soldering apparatus 100 may include one, three or more preheating sections. There is no particular limitation on preset temperature (heating temperature) in each of the preheating sections. The second preheating section 140 according to the present embodiment is not provided with an upper heater in order to ensure a path for transferring the substrate Sb to the soldering section 150 which performs the subsequent step. However, the second preheating section 140 does not necessarily have to be thus configured. On the contrary, the second preheating section 140 may be provided with the upper heater.

The cooling section 160 includes a cooling fan, not shown, and cools the substrate Sb which is subjected to soldering processing in the soldering section 150. The unloading section 170 unloads the cooled substrate Sb outside of the soldering apparatus 100.

In the soldering section 150, the substrate Sb preheated by the first and second preheating sections 130 and 140 is immersed in or brought into contact with the molten solder while placed on a mask M1. The soldering section 150 thus performs the soldering of the substrate Sb. More specifically, the soldering section 150 includes a holder 20 that holds the mask M1, a first actuator 30 that lifts and lowers the holder 20 in a vertical direction, a second actuator 40 that transfers the holder 20 in a horizontal direction, and a solder tank 50 that containing the molten solder. The first actuator 30 includes, for example, four vertical actuators which have holders 20, respectively, and lifts and lowers the substrate Sb in the vertical direction while holding four corners of the substrate Sb with the holders 20. The mask M1 may be made of material such as titanium and resin, for example.

The holder 20, for example, supports the mask M1 from underneath to hold the mask M1. The holder 20 includes a biasing device, such as a spring, not shown, which pushes the substrate Sb against the mask M1 with the substrate Sb placed on the mask M1. The first and second actuators 30 and 40, in consort with each other, are capable of transferring the mask M1 held by the holder 20 to a freely-selected position. To be more specific, when the mask M1 is preheated as described later, the first actuator 30 is lowered to bring the mask M1 into contact with the molten solder. The first actuator 30 thus functions as an example of a transferring mechanism for transferring the mask M1 at least in the vertical direction in order to immerse the mask M1 in the molten solder.

The soldering apparatus 100 according to the present embodiment further includes a substrate sensor 60 configured to detect that the substrate Sb is charged into the soldering apparatus 100, and a temperature sensor 70 configured to detect temperature of the mask M1. According to the present embodiment, the substrate sensor 60 is disposed in the loading section 110. According to the present embodiment, the temperature sensor 70 is attached to the mask M1. According to the present embodiment, the substrate sensor 60 is disposed inside the loading section 110. The substrate sensor 60, however, does not necessarily have to be disposed inside the loading section 110. The substrate sensor 60 may be disposed inside a unit located upstream of the soldering section 150 as long as the substrate sensor 60 is capable of detecting that the substrate Sb is charged into the soldering apparatus 100. The substrate sensor 60 and the temperature sensor 70 are used to determine timing for preheating the mask M1 as described later and are not essential constituent elements for the soldering apparatus 100.

The controller 180 is configured to be capable of controlling operation of the soldering apparatus 100. The controller 180 is communicably connected to the substrate sensor 60, the temperature sensor 70, and the first and second actuators 30 and 40. More specifically, the controller 180 is configured to be capable of receiving data indicating the presence/absence of the substrate Sb detected by the substrate sensor 60. The controller 180 is further configured to be capable of receiving temperature data of the mask M1, which is detected by the temperature sensor 70. The controller 180 is capable of controlling the first and second actuators 30 and 40. The controller 180 may include a PLC (programmable logic controller) including, for example, a CPU, a memory that stores an action program, and input and output modules, or the like. After size information and other pieces of information of the substrate Sb are entered into the controller 180 at the time of activating the soldering apparatus 100, the controller 180 sets a takt time, the width of the transferring device, not shown, a solder amount, etc. are set.

A process of soldering the substrate Sb by the above-discussed soldering apparatus 100 according to the present embodiment will be explained below. First, as illustrated in FIG. 1, the substrate Sb is charged into the loading section 110. For example, in response to input from an operator, the controller 180 controls at least the first actuator 30 to start the preheating of the mask M1. To be more specific, the controller 180 controls at least the first actuator 30 to bring at least a part of the mask M1 on which the substrate Sb is not placed into contact with the molten solder (see FIG. 2). In other words, according to the present embodiment, the molten solder contained in the solder tank 50 and the first actuator 30 that brings the mask M1 into contact with the molten solder form a preheater that preheats the mask M1.

The controller 180 may start preheating the mask M1 on the basis of detection data from the substrate sensor 60. More specifically, the controller 180 may start preheating the mask M1 when receiving the detection data from the substrate sensor 60, which indicates that the substrate Sb is charged into the soldering apparatus 100. The controller 180 may start the preheating of the mask M1 on the basis of detection data from the temperature sensor 70. More specifically, the controller 180 receives the temperature data of the mask M1 from the temperature sensor 70 and compares a temperature value that is received with a predetermined value that is stored in a memory or the like, not shown, of the controller 180. The controller 180 may start preheating the mask M1 when the controller 180 determines that the received temperature value is lower than the predetermined value. It is preferable that the mask M1 be totally immersed in the molten solder. By so doing, the entire mask M1 is heated in a more even manner.

The mask M1 is preheated preferably to 150° C. or higher, further preferably to 170° C. or higher, and still further preferably to 190° C. or higher. In short, unlike the conventional art in which the mask M1 is disposed near the solder tank 50, the present embodiment is designed to preheat the mask M1 to a high temperature. When the solder Sb is subjected to soldering, the mask M1 contacts the molten solder while an upper surface of the mask M1 is covered with the substrate Sb (while the upper surface of the mask M1 is in contact with the substrate Sb). If the mask M1 is not preheated, a lower surface of the mask M1 is preferentially increased in temperature by the molten solder during the soldering of the substrate Sb. This generates a large difference in temperature (approximately 100° C., for example) between the lower and upper surfaces of the mask M1. Consequently, the mask M1 might be warped and failed to properly contact the substrate Sb. According to the present embodiment, in contrast, the mask M1 is preheated at least to 150° C. or higher, and this reduces the temperature difference between the lower and upper surfaces of the mask M1, which is generated when the mask M1 contacts the molten solder. More specifically, if the mask M1 is preheated to 220° C., it is possible to reduce the temperature difference between the lower and upper surfaces of the mask M1 approximately one second after the contact between the mask M1 and the molten solder to approximately 60° C. The reduction of the temperature difference between the lower and upper surfaces of the mask M1 prevents the mask M1 from being warped during the soldering and ensures a proper contact between the mask M1 and the substrate Sb.

The substrate Sb is then sequentially transferred from the loading section 110 to the first preheating section 130 to the second preheating section 140 to be preheated. As illustrated in FIG. 2, the substrate Sb is preheated at the same time as when the mask M1 is preheated by the molten solder. This prevents the preheating of the mask M1 from degrading throughput.

By the time when the substrate Sb is transferred to the soldering section 150, the mask M1 is retrieved from the molten solder and transferred to a position for receiving the substrate Sb in a well-preheated state. After the substrate Sb is placed on the mask M1, the controller 180 solders the substrate Sb. More specifically, the controller 180 controls the holder 20 and the first and second actuators 30 and 40, thereby causing the holder 20 to hold the substrate Sb and the mask M1 and bringing at least a part of the substrate Sb placed on the preheated mask M1 into contact with the molten solder (see FIG. 3). The substrate Sb subjected to the soldering processing is cooled by the cooling section 160 and then removed from the soldering apparatus 100 through the unloading section 170.

As discussed above, in the soldering apparatus 100 according to the present embodiment, since the mask M1 is preheated by the soldering section 150, the temperature difference between the preheated substrate Sb and the mask M1 is reduced. This makes it possible to prevent a soldering quality deterioration that is caused by the cooling of the substrate Sb when the preheated substrate Sb is placed on the mask M1. Since the present embodiment preheats the mask M1 on which the substrate Sb is not placed, the substrate Sb can be preheated at the same time as when the mask M1 is preheated. This prevents the preheating of the mask M1 from degrading the throughput. Furthermore, according to the present embodiment, the mask M1 is preheated by the molten solder used for the soldering, which eliminates the necessity of providing particular equipment for preheating the mask M1 and prevents an increase in size and cost of the soldering apparatus 100.

The following descriptions explain the preheating of the mask M1 in a situation where the second and subsequent substrates Sb are processed. After the first substrate Sb is subjected to the soldering processing, the mask M1 is heated to a sufficient temperature. However, when a plurality of substrates Sb are processed in a serial manner, for example, when the second and subsequent substrates Sb are soldered, if an interval between the charging of the substrate Sb and the charging of the subsequent substrate Sb is prolonged, the mask M1 is naturally cooled and decreased in temperature. To prevent such a problem, according to the present embodiment, the controller 180 starts preheating the mask M1 on the basis of the detection result from at least one of the substrate sensor 60 and the temperature sensor 70.

In particular, when the substrate sensor 60 does not detect that the substrate Sb is charged into the soldering apparatus 100 for a predetermined time period, that is, when the controller 180 does not receive from the substrate sensor 60 the data indicating that the substrate Sb is detected for a predetermined time period, the controller 180 is allowed to start preheating the mask M1. The mask M1 is thus preheated when the substrate is not charged into the soldering apparatus 100 for the predetermined time period. The mask M1 is therefore maintained at a relatively high temperature even when the charging interval of the substrates Sb is prolonged.

The controller 180 further receives the temperature data of the mask M1 from the temperature sensor 70 and compares the received temperature value with the predetermined vale stored in the memory or the like, not shown, of the controller 180. The controller 180 may start preheating the mask M1 when the controller 180 determines that the received temperature value is lower than the predetermined value. The mask M1 is thus preheated when reaching a temperature equal to or lower than the predetermined value. This prevents the mask M1 from being soldered when the mask M1 has low temperature.

Figure 4:
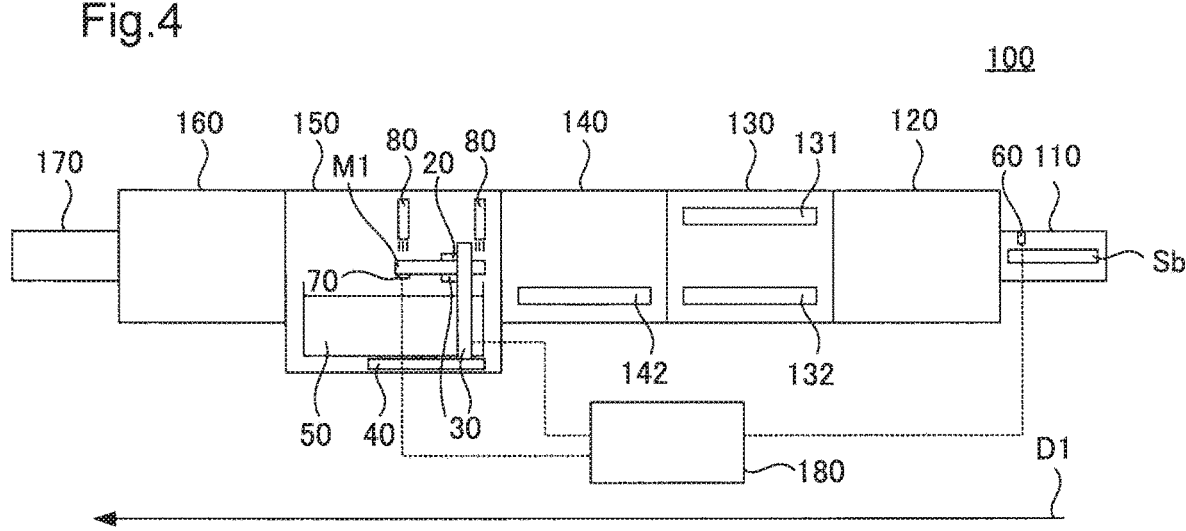
FIG. 4 is a schematic lateral view of a soldering apparatus according to another embodiment.
Figure 5:
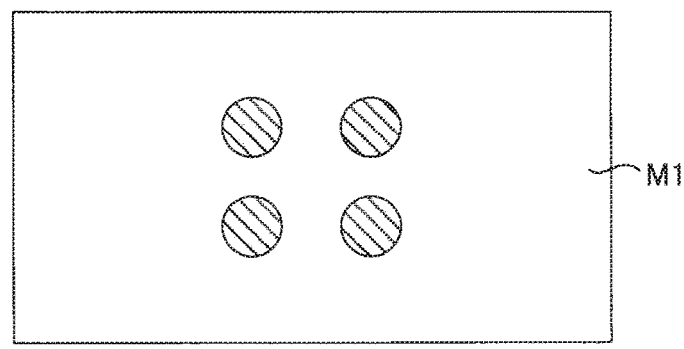
FIG. 5 is a schematic view showing areas heated by torch heaters on a mask.
Figure 6:
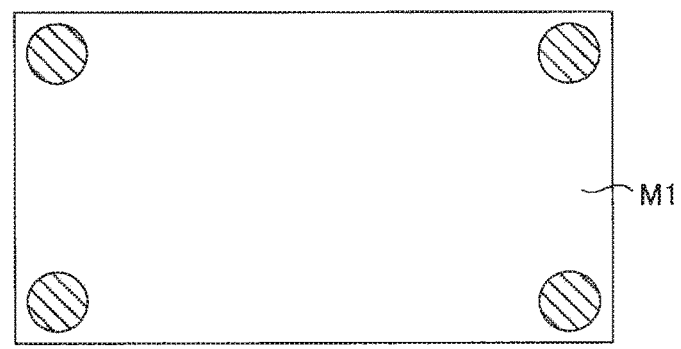
FIG. 6 is a schematic view showing areas heated by torch heaters on a mask.
Figure 7:
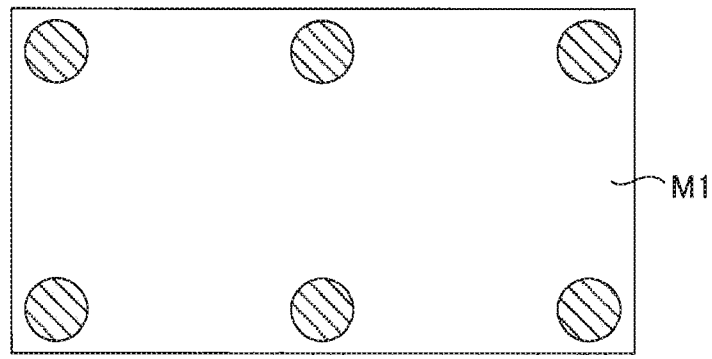
FIG. 7 is a schematic view showing areas heated by torch heaters on a mask.
Figure 8:
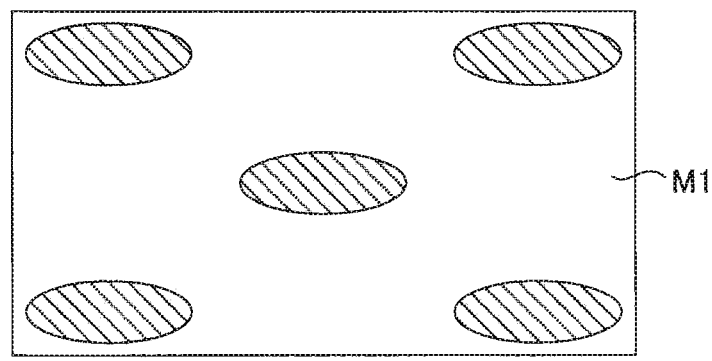
FIG. 8 is a schematic view showing areas heated by torch heaters on a mask.
Figure 9:
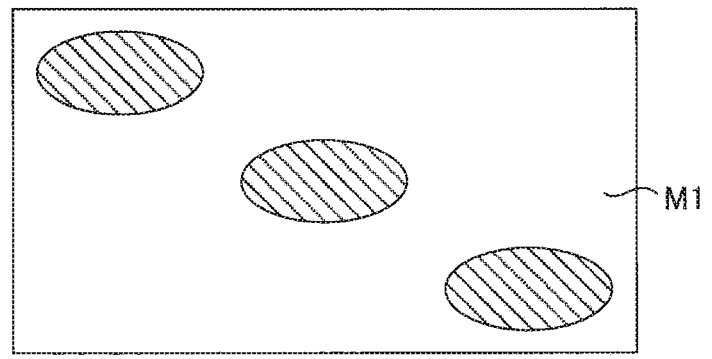
FIG. 9 is a schematic view showing areas heated by torch heaters on a mask.

FIG. 4 is a schematic lateral view of a soldering apparatus according to another embodiment. Unlike the soldering apparatus 100 illustrated in FIGS. 1, 2 and 3, the soldering apparatus 100 illustrated in FIG. 4 includes a torch heater 80 (corresponding to an example of the preheater) for preheating the mask M1. As illustrated in FIG. 4, the soldering apparatus 100 includes one or more torch heaters 80 in the soldering section 150 (FIG. 4 shows two torch heaters 80). The torch heater 80 is driven by the controller 180.

FIGS. 5 to 9 are schematic views showing areas heated by the torch heaters 80 on the mask M1. According to the examples shown in FIGS. 5 to 9, the mask M1 has a rectangular shape with long and short sides. Shaded areas of FIGS. 5 to 9 schematically show areas directly contacted by hot winds from the torch heaters 80. According to the example illustrated in FIG. 5, the hot winds from the four torch heaters 80 blow against a substantially central area of the mask M1. According to the example illustrated in FIG. 6, the hot winds from the four torch heaters 80 blow against four corners of the mask M1. According to the example illustrated in FIG. 7, the hot winds from the six torch heaters 80 blow against the four corners of the mask M1 and a middle area of each long side of the mask M1. According to the example illustrated in FIG. 8, the hot winds from the five torch heaters 80 blow against the four corners and the substantially central area of the mask M1. According to the example illustrated in FIG. 9, the hot winds from the three torch heaters 80 blow against two opposite corners and the substantially central area of the mask M1.

The torch heaters 80 are spaced away from the mask M1 at predetermined distance. This facilitates diffusion of the heat from the torch heaters 80 in the entire mask M1. The areas heated by the torch heaters 80 illustrated in FIGS. 5 to 9 are examples. The number of the torch heaters 80 and the areas heated by the torch heaters 80 are not limited to those illustrated in the drawings. However, it is preferable that the entire mask M1 be evenly heated by the torch heaters 80.

The following descriptions explain a process of soldering the substrate Sb using the soldering apparatus 100 illustrated in FIG. 4. As illustrated in FIG. 4, the substrate Sb is first charged into the loading section 110, and the controller 180 then controls the torch heaters 80, for example, in response to input from an operator and thus starts preheating the mask M1. To be specific, the controller 180 controls the torch heaters 80 to cause the hot winds to blow against the mask M1 on which the substrate Sb is not placed.

The controller 180 may start preheating the mask M1 on the basis of detection data from the substrate sensor 60, as in the soldering apparatus 100 of FIGS. 1, 2 and 3. More specifically, the controller 180 may start preheating the mask M1 when receiving the detection data from the substrate sensor 60, which indicates that the substrate Sb is charged into the soldering apparatus 100. The controller 180 may start preheating the mask M1 on the basis of detection data from the temperature sensor 70. More specifically, the controller 180 receives the temperature data of the mask M1 from the temperature sensor 70 and compares a received temperature value with the predetermined value stored in the memory or the like, not shown, of the controller 180. The controller 180 may start preheating the mask M1 when the controller 180 determines that the received temperature value is lower than the predetermined value. The mask M1 is preheated preferably to 150° C. or higher, further preferably to 170° C. or higher, and still further preferably to 190° C. or higher.

The substrate Sb is then sequentially transferred from the loading section 110 to the first preheating section 130 to the second preheating section 140 to be preheated. As illustrated in FIG. 2, the substrate Sb is preheated at the same time as when the mask M1 is preheated by the molten solder. This prevents the preheating of the mask M1 from degrading throughput.

The mask M1 is transferred to the position for receiving the substrate Sb in the well-preheated state. After the substrate Sb is placed on the mask M1, the controller 180 controls the first and second actuators 30 and 40 and thus brings at least a part of the substrate Sb placed on the preheated mask M1 into contact with the molten solder, to thereby solder the substrate Sb. The substrate Sb subjected to the soldering processing is cooled by the cooling section 160 and then removed from the soldering apparatus 100 through the unloading section 170.

FIG. 10 is a schematic lateral view of a soldering apparatus according to still another embodiment. A soldering apparatus 200 illustrated in FIG. 10 differs from the soldering apparatus 100 illustrated in FIGS. 1, 2 and 3 in that the loading section 110 and the unloading section 170 are disposed at the same end. As illustrated in FIG. 10, the soldering apparatus 200 includes a substrate discharging section 190. The substrate discharging section 190 includes a pusher, not shown, which enables the substrate discharging section 190 to discharge and deliver the substrate soldered by the soldering section 150 to the cooling section 160. The cooling section 160 extends from the substrate discharging section 190 to the unloading section 170. The cooling section 160 cools the substrate Sb while transferring the substrate Sb in a direction of arrow D2 that is opposite to the arrow D1. The cooling section 160 may be located beside, above or under the fluxer 120, the first preheating section 130, the second preheating section 140, and the soldering section 150. According to the soldering apparatus 200 illustrated in FIG. 10, the torch heaters 80 illustrated in FIG. 4 are adoptable in the soldering section 150. According to the soldering apparatus 200 illustrated in FIG. 10, since the loading section 110 and the unloading section 170 are disposed at the same end, the charging and removal of the substrate Sb into and from the soldering apparatus 200 is carried out at the same end, improving work efficiency.

The embodiments of the invention have been discussed. The above-described embodiments of the invention are not intended to limit the invention but to facilitate the understanding of the invention. Needless to say, the invention may be modified or improved without deviating from the gist thereof, and includes equivalents thereto. The constituent elements mentioned in the claims and the description may be arbitrarily combined or omitted as long as at least a part of the above-mentioned problem is solved or at least a part of the advantageous effects is produced.

The following are embodiments disclosed by the present application.

A first embodiment provides a soldering method. The soldering method includes preheating a mask on which a substrate is not placed, placing the substrate on the mask that is preheated, and bringing at least a part of the substrate placed on the preheated mask into contact with molten solder and thus soldering the substrate.

According to the first embodiment, the preheating of the mask reduces a temperature difference between the preheated substrate and the mask. This prevents a deterioration in soldering quality, which is caused by the substrate being cooled when the preheated substrate is placed on the mask. The first embodiment preheats the mask on which the substrate is not placed. The substrate therefore can be preheated at the same time as when the mask is preheated. This prevents the preheating of the mask from degrading throughput.

According to a second embodiment of the soldering method described in the first embodiment, the soldering method further includes preheating the substrate in the preheating section.

According to the second embodiment, the substrate is preheated at the same time as when the mask is preheated, which prevents the preheating of the mask from degrading the throughput.

According to a third embodiment of the soldering method described in the first or second embodiment, the preheating of the mask includes bringing at least a part of the mask on which the substrate is not placed into contact with the molten solder.

According to the third embodiment, the mask is preheated by the molten solder used for soldering, which eliminates the necessity of providing particular equipment for preheating the mask and prevents an increase in size and cost of the soldering apparatus.

According to a fourth embodiment of the soldering method described in the third embodiment, the preheating of the mask includes immersing the entire mask on which the substrate is not placed in the molten solder.

According to the fourth embodiment, the mask is totally immersed in the molten solder, so that the entire mask is heated in a more even manner.

According to a fifth embodiment of the soldering method described in the first or second embodiment, the preheating of the mask includes blowing a hot wind against the mask on which the substrate is not placed.

According to the fifth embodiment, the substrate is preheated at the same time as when the mask is preheated, which prevents the preheating of the mask from degrading the throughput.

According to a sixth embodiment of the soldering method described in any one of the first to fifth embodiments, the preheating of the mask includes preheating the mask on which the substrate is not placed to 150° C. or higher.

According to the sixth embodiment, the mask is preheated to a higher temperature, as compared to when simply disposed near a solder tank. Consequently, when the substrate is soldered using the preheated mask, a temperature difference between a lower surface (surface contacted by the molten solder) of the mask and an upper surface (surface contacted by the substrate) of the mask is reduced. This prevents warpage of the mask, which occurs during the soldering due to the temperature difference between the lower and upper surfaces of the mask.

According to a seventh embodiment of the soldering method described in any one of the first to sixth embodiments, the soldering method includes detecting temperature of the mask, and the preheating of the mask is performed when the temperature of the mask reaches a predetermined or lower value.

According to the seventh embodiment, the mask is preheated when reaching the temperature equal to or lower than the predetermined value. This more reliably prevents the soldering from being performed when the mask has a low temperature.

According to an eighth embodiment of the soldering method described in any one of the first to seventh embodiments, the soldering method includes detecting that the substrate is charged into the soldering apparatus, and the preheating of the mask is performed when the charging of the substrate in the soldering apparatus is not detected for a predetermined time period.

In a case where a plurality of substrates are sequentially processed, for example, when a second and subsequent substrates are subjected to soldering, if an interval between the charging of a substrate and the charging of the subsequent substrate is prolonged, the temperature of the mask is reduced. According to the eighth embodiment, since the mask is preheated when the substrate is not charged into the soldering apparatus for the predetermined time period, the mask is maintained at a relatively high temperature even when the charging interval of the substrates is prolonged.

A ninth embodiment provides a soldering apparatus. The soldering apparatus includes a preheater configured to preheat a mask on which a substrate is not placed, and a soldering section configured to solder the substrate placed on the preheated mask.

According to the ninth embodiment, the preheating of the mask reduces a temperature difference between the preheated substrate and the mask. This prevents a soldering quality from being deteriorated by the substrate being cooled when the preheated substrate is placed on the mask. Since the ninth embodiment preheats the mask on which the substrate is not placed, the substrate can be preheated at the same time as when the mask is preheated. This prevents the preheating of the mask from degrading throughput.

According to a tenth embodiment of the soldering apparatus described in the ninth embodiment, the soldering apparatus includes a preheating section configured to preheat the substrate.

According to the tenth embodiment, the substrate is preheated at the same time as when the mask is preheated. This prevents the preheating of the mask from degrading throughput.

According to an eleventh embodiment of the soldering apparatus described in the ninth or tenth embodiment, the soldering section includes a solder tank containing molten solder and a transferring mechanism configured to transfer the mask at least in a vertical direction. The transferring mechanism is configured to bring at least a part of the mask on which the substrate is not placed into contact with the molten solder. The solder tank and the transferring mechanism form the preheater.

According to the eleventh embodiment, the mask is preheated by the molten solder used for soldering, which eliminates the necessity of providing particular equipment for preheating the mask and thus prevents an increase in size and cost of the soldering apparatus. The transferring mechanism is provided to ordinary soldering apparatuses to solder a substrate placed on a mask.

According to a twelfth embodiment of the soldering apparatus described in the eleventh embodiment, the transferring mechanism is configured to immerse the entire mask on which the substrate is not placed in the molten solder.

According to the twelfth embodiment, the mask is totally immersed in the molten solder, so that the entire mask is heated in a more even manner.

According to a thirteenth embodiment of the soldering apparatus described in the ninth or tenth embodiment, the preheater includes a torch heater configured to blow a hot wind against the mask on which the substrate is not placed.

According to the thirteenth embodiment, the substrate is preheated at the same time as when the mask is preheated. This prevents the preheating of the mask from degrading throughput.

According to a fourteenth embodiment of the soldering apparatus described in any one of the ninth to thirteenth embodiments, the soldering apparatus includes a temperature sensor configured to detect temperature of the mask, and a controller configured to control the preheater. When the controller determines that the temperature of the mask reaches a predetermined or lower value, the controller controls the preheater to preheat the mask on which the substrate is not placed.

According to the fourteenth embodiment, the mask is preheated when reaching a temperature equal to or lower than the predetermined value. This more reliably prevents the soldering from being performed when the mask has a low temperature.

According to a fifteenth embodiment of the soldering apparatus described in any one of the ninth to fourteenth embodiments, the soldering apparatus includes a substrate sensor configured to detect that the substrate is charged into the soldering apparatus, and a controller configured to control the preheater. The controller controls the preheater to preheat the mask on which the substrate is not placed when the charging of the substrate in the soldering apparatus is not detected by the substrate sensor for a predetermined time period.

In a case where a plurality of substrates are sequentially processed, for example, when a second and subsequent substrates are subjected to soldering, if an interval between the charging of a substrate and the charging of the subsequent substrate is prolonged, the temperature of the mask is reduced. Since the fifteenth embodiment preheats the mask when the substrate is not charged into the soldering apparatus for the predetermined time period, the mask is maintained at a relatively high temperature even when the charging interval of the substrates is prolonged.

REFERENCE SIGN LIST

M1: mask
Sb: substrate
30: first actuator
50: solder tank
60: substrate sensor
70: temperature sensor
80: torch heater
100: soldering apparatus
130: first preheating section
140: second preheating section
150: soldering section
180: controller

What is claimed is:

1. A soldering apparatus comprising:
a loading section configured to charge a substrate into the soldering apparatus,
an unloading section configured to unload the substrate out of the soldering apparatus, the unloading section being different from the loading section,
a mask preheater configured to preheat a mask on which the substrate is not placed,
a soldering section configured to solder the substrate placed on the mask which is preheated,
a preheating section including a substrate preheater configured to preheat the substrate which is not placed on the mask, and
a cooling section configured to cool the substrate soldered by the soldering section, and
a substrate discharging section configured to discharge and deliver the substrate soldered by the soldering section to the cooling section,
wherein the mask preheater is separate from the substrate preheater of the preheating section and the mask preheater is positioned separate from the preheating section and between the preheating section and the unloading section, and the cooling section is positioned separate from the soldering section and between the soldering section and the unloading section,
wherein the loading section and the unloading section are disposed at the same end,
the cooling section extends from the substrate discharging section to the unloading section, and
the substrate is delivered in a first direction from the loading section to the substrate discharging section, and delivered in a second direction opposite to the first direction through the cooling section to the unload section.

2. The soldering apparatus according to claim 1,
wherein the soldering section includes a solder tank containing molten solder and a transferring mechanism configured to transfer the mask on which the substrate is placed at least in a vertical direction to solder the substrate; and
wherein the mask preheater is in the soldering section and includes the transferring mechanism being further configured to bring the mask on which the substrate is not placed into contact with the molten solder in the solder tank to preheat the mask.

3. The soldering apparatus according to claim 2,
wherein the transferring mechanism is configured to immerse the entire mask on which the substrate is not placed in the molten solder.

4. The soldering apparatus according to claim 1,
wherein the mask preheater includes a torch heater configured to blow a hot wind against the mask on which the substrate is not placed.

5. The soldering apparatus according to claim 1, comprising:
a temperature sensor configured to detect temperature of the mask; and
a controller configured to control the mask preheater,
wherein, when the controller determines that the temperature of the mask reaches a predetermined or lower value, the controller controls the mask preheater to preheat the mask on which the substrate is not placed.

6. The soldering apparatus according to claim 1, comprising:
a substrate sensor configured to detect that the substrate is charged into the soldering apparatus, and
a controller configured to control the mask preheater,
wherein the controller controls the mask preheater to preheat the mask on which the substrate is not placed when the charging of the substrate in the soldering apparatus is not detected by the substrate sensor for a predetermined time period.

7. A soldering apparatus comprising:
a loading section configured to charge a substrate into the soldering apparatus,
an unloading section configured to unload the substrate out of the soldering apparatus, the unloading section being different from the loading section,
a mask preheater configured to preheat a mask on which the substrate is not placed,
a soldering section configured to solder the substrate placed on the mask which is preheated,
a preheating section including a substrate preheater configured to preheat the substrate which is not placed on the mask, and
a cooling section configured to cool the substrate soldered by the soldering section,
wherein the mask preheater is separate from the substrate preheater of the preheating section and the mask preheater is positioned separate from the preheating section and between the preheating section and the unloading section, and the cooling section is positioned separate from the soldering section and between the soldering section and the unloading section, and
wherein the mask preheater includes a torch heater configured to blow a hot wind against the mask on which the substrate is not placed.

* * * * *